United States Patent [19]

Kauth

[11] Patent Number: 4,590,607

[45] Date of Patent: May 20, 1986

[54] IMAGE CORRESPONDENCE TECHNIQUES USING SERIAL NEIGHBORHOOD PROCESSING

[75] Inventor: Richard J. Kauth, Ypsilanti, Mich.

[73] Assignee: Environmental Research Institute of Michigan, Ann Arbor, Mich.

[21] Appl. No.: 755,706

[22] Filed: Jul. 16, 1985

Related U.S. Application Data

[63] Continuation-in-part of Ser. No. 419,259, Sep. 17, 1982, abandoned.

[51] Int. Cl.$^4$ ............................................. G06K 9/36
[52] U.S. Cl. ..................................... 382/41; 358/105; 382/44; 382/49
[58] Field of Search ....................... 382/46, 41, 45, 44, 382/49, 23; 358/105, 107, 282, 284; 356/2

[56] References Cited

U.S. PATENT DOCUMENTS

| | | | |
|---|---|---|---|
| 3,114,797 | 12/1963 | Williams | 358/105 |
| 3,905,045 | 9/1975 | Nickel | 356/2 |
| 4,322,716 | 3/1982 | Sternberg | 382/49 |
| 4,477,926 | 10/1984 | Linger et al. | 382/49 |
| 4,481,664 | 11/1984 | Linger et al. | 358/107 |

OTHER PUBLICATIONS

Lougheed et al., "The Cytocomputer: A Practical Pipelined Image Processor", Nov. 1979, pp. 1-25.
Barrows et al., "Parametric Correspondence and Chamfer Matching: Two New Techniques for Image Matching", Prod. of the 5th Int. Conf. of Artificial Intellegence, 1977, pp. 659-663.

Primary Examiner—Leo H. Boudreau
Assistant Examiner—Joseph Mancuso
Attorney, Agent, or Firm—Krass and Young

[57] ABSTRACT

A serial neighborhood processing system, preferably employing a pipeline of individually programmable stages, is used to detect image correspondence between multiple frames of image data. Similar features in each frame are extracted utilizing a series of dilation and erosion sequences. In particular, landmarks in each frame are condensed to single image points having exactly one corresponding point in the other frame surrounding it within a given mathematical distance. The second frame of pixel data is registered with the first frame as a function of the spatial relationship between these pairs of matched points in the two reduced frames. A comparison is made between the first frame and the registered second frame to detect differences therebetween. Motion detection, stereo projection, registration of multidate Landsat imagery and matching images of electrophoretic gels are examples of particular uses for the techniques disclosed.

4 Claims, 7 Drawing Figures

| FRAME 1 | | FRAME 2 | |
|---|---|---|---|
| POINT | (x, y) | POINT | (x', y') |
| 22 | $(x_{22}, y_{22})$ ———— | 22' | $(x'_{22}, y'_{22})$ |
| 24 | $(x_{24}, y_{24})$ ———— | 24' | $(x'_{24}, y'_{24})$ |
| 26 | $(x_{26}, y_{26})$ ———— | 26' | $(x'_{26}, y'_{26})$ |
| 28 | $(x_{28}, y_{28})$ ⟍ | 28' | $(x'_{28}, y'_{28})$ |
| 30 | $(x_{30}, y_{30})$ ⟋ | 30' | $(x'_{30}, y'_{30})$ |
| 32 | $(x_{32}, y_{32})$ ———— | 32' | $(x'_{32}, y'_{32})$ |
| 34 | $(x_{34}, y_{34})$ | | |
*Fig-4*
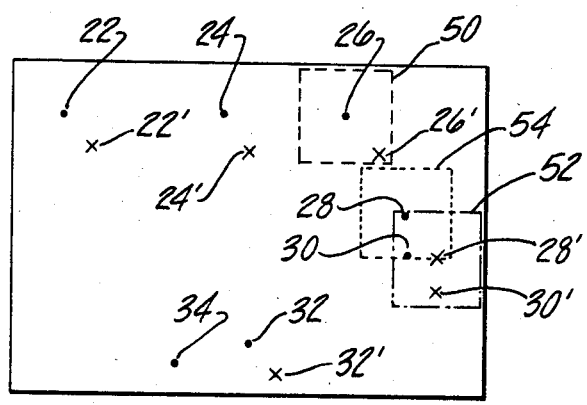
*Fig-5*
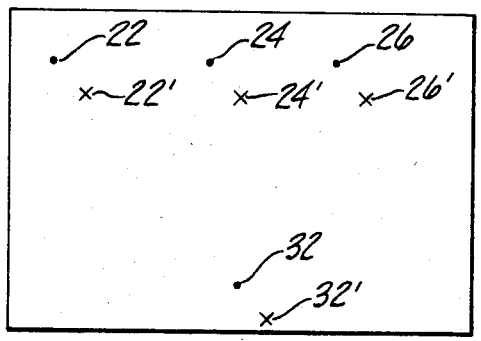
*Fig-6*
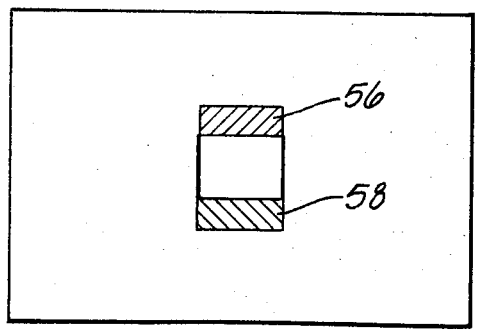
*Fig-7*

IMAGE CORRESPONDENCE TECHNIQUES USING SERIAL NEIGHBORHOOD PROCESSING

REFERENCE TO RELATED APPLICATION

This is a continuation-in-part of application Ser. No. 419,259, filed Sept. 17, 1982, now abandoned.

TECHNICAL FIELD

This invention relates to automatic image processors. More particularly, it involves techniques for registering multiple frames of image data having at least some common features.

BACKGROUND ART

One of the most perplexing problems in the field of automatic image processing is the proper orientation of related but not necessarily identical frames of image data, also referred to in the pattern recognition literature as the correspondence problem. It encompasses problems such as the registration of two images, the problem of stereo projection, the problem of ranging by the use of two images, and many others.

It is known that useful information can be extracted by registering two frames of image data matrices, i.e., by superimposing them and comparing the differences between the pixels of the two frames. Such a technique is useful, for example, to detect motion of an object that has occurred between the times that the two image frames were taken. Assuming perfect registration between the two frames, by subtracting the values of the corresponding pixels the stationary features will be removed while leaving pixels associated with the moving object since its location will be different in the two frames.

Unfortunately, the registration of two images is no easy task. The task is somewhat simpler when there is a priori knowledge about the characteristics of the scene being investigated. If, for example, a reference map has been made beforehand, then it is much easier to project the image onto the reference map since the orientation and spatial location of the landmarks are fixed in the latter. General purpose computers have been employed with some success using parametric correspondence and chamfer matching techniques for image matching. See, e.g., Barrow et al, "Parametric Correspondence and Chamfer Matching: Two New Techniques for Image Matching", Proceedings of the Fifth International Conference on Artificial Intelligence, 1977. Other techniques are disclosed in U.S. Pat. No. 3,905,045.

This image correspondence problem becomes particularly acute when there is little, if any, a priori knowledge of the scene under investigation. In the field of FLIR (forward looking infrared) imagery, image data is obtained from an infrared scanner mounted on an airplane surveying a large territory. It is highly desirable, in some applications, to be able to automatically detect the motion of an object within the gathered image data. However, there is generally little a priori knowledge of the particular terrain from which the image data is derived. Further aggravating the situation is the fact that the orientation and scale between successive frames of image data can be quite different due to the motion of the aircraft. Consequently, it is extremely burdensome and difficult to obtain useful information under such circumstances.

OBJECT AND SUMMARY OF THE INVENTION

According to the teachings of the present invention, a serial neighborhood processing system preferably employing a chain of individually programmable neighborhood processing stages is employed to bring two or more frames of image data into correspondence without need for a priori information. Each frame of image data is transformed by a series of erosion steps to reduce particular features in each frame to more well-defined discrete islands, preferably single points. Ambiguities are eliminated by removing all points in each of the transformed image frames having more than one point in the other frame surrounding it within a given mathematical distance. This reduces the frames to matrices of non-connected or single points having only one corresponding point near it in the other frame. From these sets of points a translation transformation is generated and applied to the second frame of image data to map it into the first frame as a function of the spatial location differences between the corresponding landmark points in the two transformed frames. If registration of the frames is not satisfactory, this procedure can be repeated, to bring the frames into closer correspondence, usually using more features. With the two frames now in registration a comparison can be readily made to detect differences therebetween and thereby locate such features of interest as the movement of a particular object and the like.

BRIEF DESCRIPTION OF THE DRAWINGS

The particular advantages of the present invention will become apparent to one skilled in the art upon reading the following specification and by reference to the drawings in which:

FIG. 4 is a pair of lists illustrating the association of pairs of points in the frames of FIG. 1;

FIG. 5 illustrates the superimposition of two transformed frames of image data during one step of the method of the present invention;

FIG. 6 is a view similar to FIG. 4 during a subsequent step; and FIG. 7 pictorially illustrates the detection of motion of an object between frame 1 and 2 of FIG. 1.

DETAILED DESCRIPTION OF THE PREFERRED EMBODIMENT

The various features of the present invention will be described in connection with a particular example. However, those skilled in the art will appreciate that this invention has a much wider utility and, thus, the scope of the invention should not be limited to the specific example.

Figure 1:
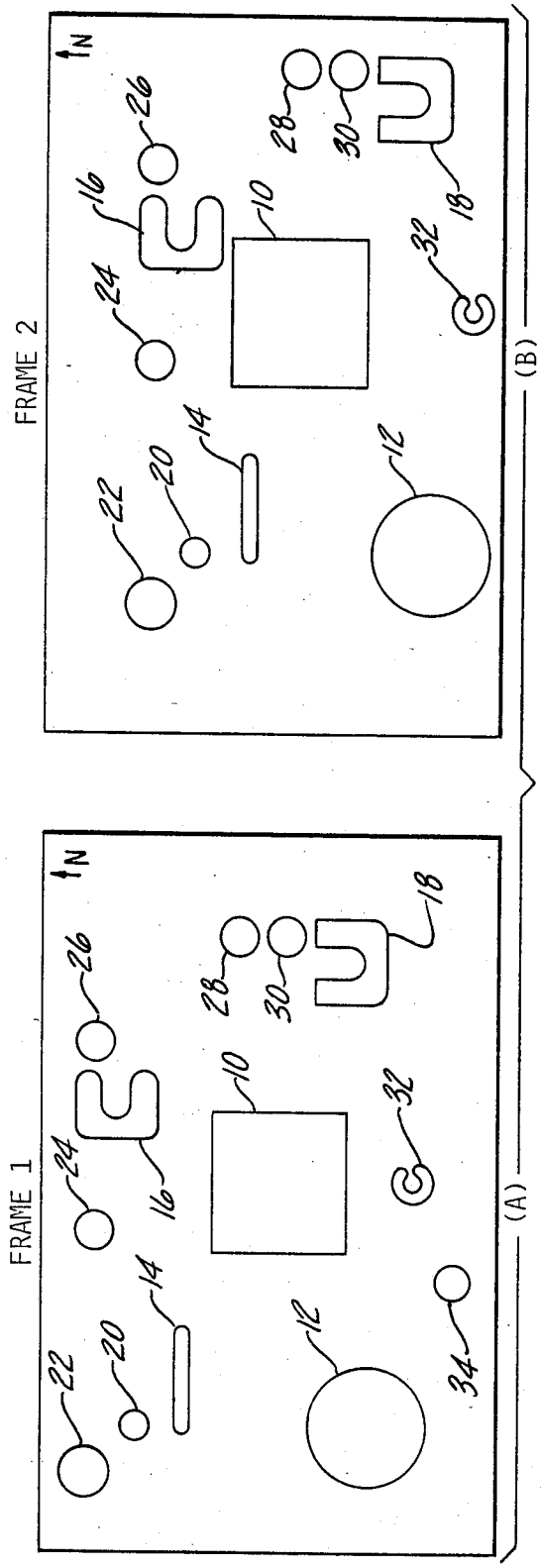
FIG. 1 (A–B) illustrates two successive image frames in simplified form.

With this caveat in mind the present invention will be described in connection with the task of detecting motion of a given object between two frames of image data. FIG. 1 illustrates a very simplified form two successive frames of image data taken at different times by an image sensor, where the object data have been distinguished from the background data. Assume that frame 1 of FIG. 1A was taken of a particular scene at a given time by a downward-looking infrared camera mounted on an aircraft traveling in the northwesterly direction at a relatively great altitude. The square object 10 in frame 1 represents a moving object such as a vehicle, whereas the other variously shaped objects 12-34 represent stationary features. It should be understood that in actual practice the image data is much more complex but to aid in the understanding of the present invention it has been greatly simplified. Frame 2 of FIG. 1B is taken a short period of time after frame 1. A comparison of frame 2 with frame 1 will show that the objects in frame 2 are displaced toward the lower righthand corner to account for the northwesterly travel of the airplane. An examination will also show that the vehicle labeled with the reference numeral 10 has moved in the northerly direction.

One can appreciate that, if frame 1 and frame 2 are brought into registry, or superimposed, little useful information can be extracted since the stationary features in frame 2 are offset from their spatial location in frame 1. However, if frame 2 is translated in the northwesterly direction, then correspondence will occur except for the fact that vehicle 10 was moved. The present invention is directed to solving this correspondence problem automatically.

The registration problem is usually further compounded by the fact that the second frame is generally rotated with respect to frame 1 as well as translated. In addition, frame 2 may be taken at a different scale, e.g., the camera may have been closer to the scene than in frame 1 thereby giving the same features a larger appearance. Noise is another factor that must be considered and should be filtered from the scene containing these landmark features.

Figure 2:
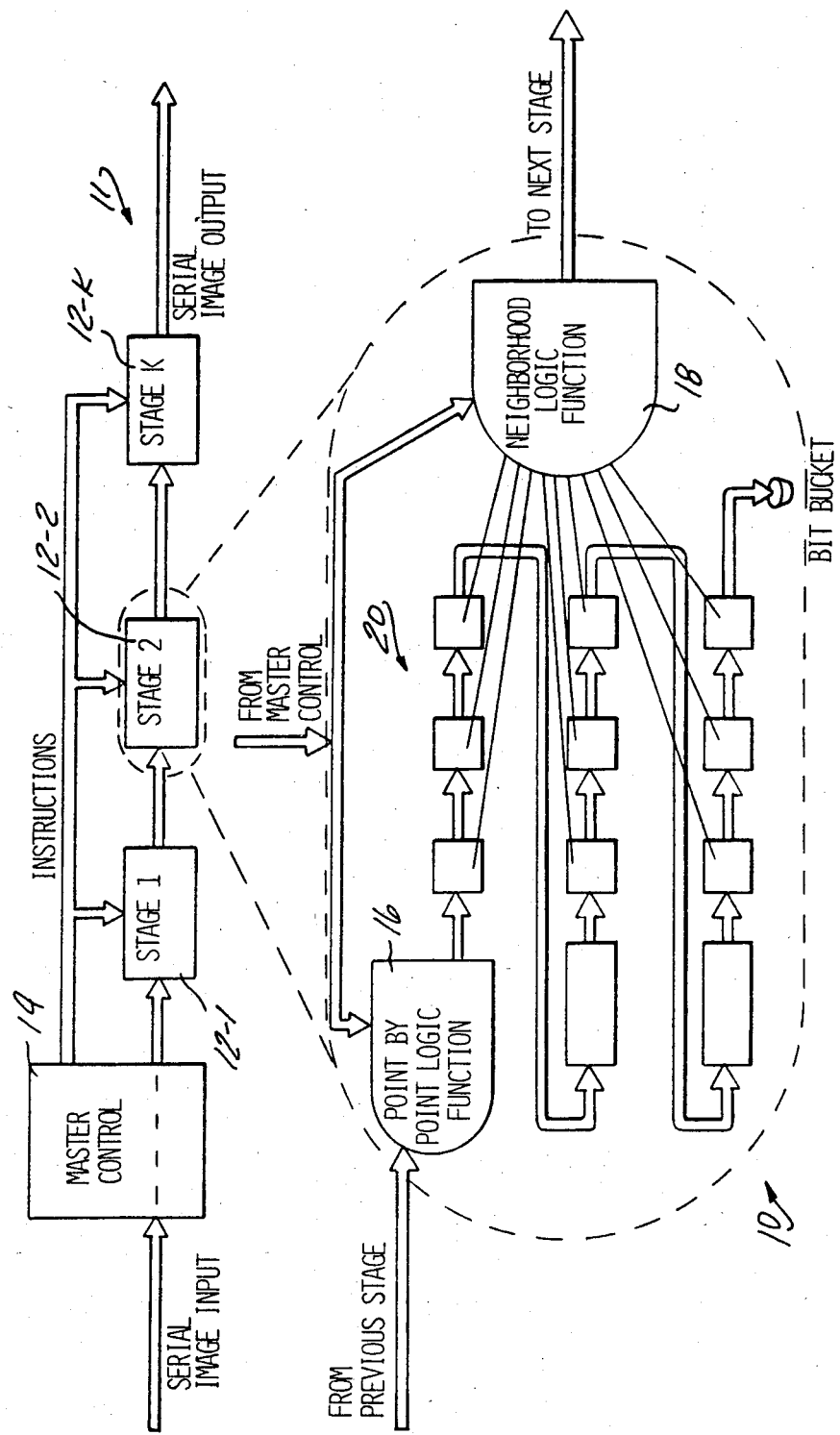
FIG. 2 is a schematic diagram of a serial neighborhood processing system used to analyze the image data in the preferred embodiment.

Pursuant to the present invention, the image data matrices of the two frames are represented by a serial stream of pixels and provided to the input of the image processing system 36 shown in FIG. 2. Digitization of the raw data from the scanner may be carried out in any suitable manner known in the art. Preferably, each picture element or pixel maintains its full gray scale value and is fed to system 36 in a raster scan line format.

The system of FIG. 2 employs a pipeline 40 of individually programmable neighborhood transformation stages 38-1 to 38-K. Each stage is programmed by master controller 42 to perform certain operations on the incoming pixel data. The pixel data is shifted down the pipeline of stages 38 with each stage ultimately performing its given operation over the entire matrix of image data. Such operations include point-by-point functions carried out by circuitry 44. These functions include scaling or other operations which do not depend upon the values of neighboring pixels in the image matrix. Neighborhood transformations are performed by neighborhood logic function circuitry 46 as each new neighborhood is shifted into the array of neighborhood extraction registers 48. The output of each stage is connected to the input of the subsequent stage so that the output of the pipeline occurs at the same rate as data is fed to its input after the pipeline has been filled.

The details of a preferred serial neighborhood processing system, along with a more definitive explanation of the operations carried out in each stage are disclosed in U.S. Pat. Nos. 4,167,728, 4,322,716, and 4,395,698, which are hereby incorporated by reference. These patents are each assigned to the Environmental Research Institute of Michigan, the assignee of the present invention. Disclosed therein are neighborhood transformations called erosion (or shrink) operations and dilation (or expand) operations. Briefly, erosion of an image matrix A by structuring element S defines a new image matrix A' in which S can be centered on all nonbackground image points in A' and still be completely contained in all nonbackground image features in A. Erosion can be thought of as a geometrical subtraction process. Dilation of an image matrix A by structuring element S defines a new image matrix A' which S will cover when its center is positioned at any nonbackground point of A. Dilation can be envisioned as a geometrical addition process. These erosion and dilation sequences are carried out in system 36 by appropriately programming the neighborhood logic circuitry 46 of each stage with the desired structuring element pattern.

Figure 3:
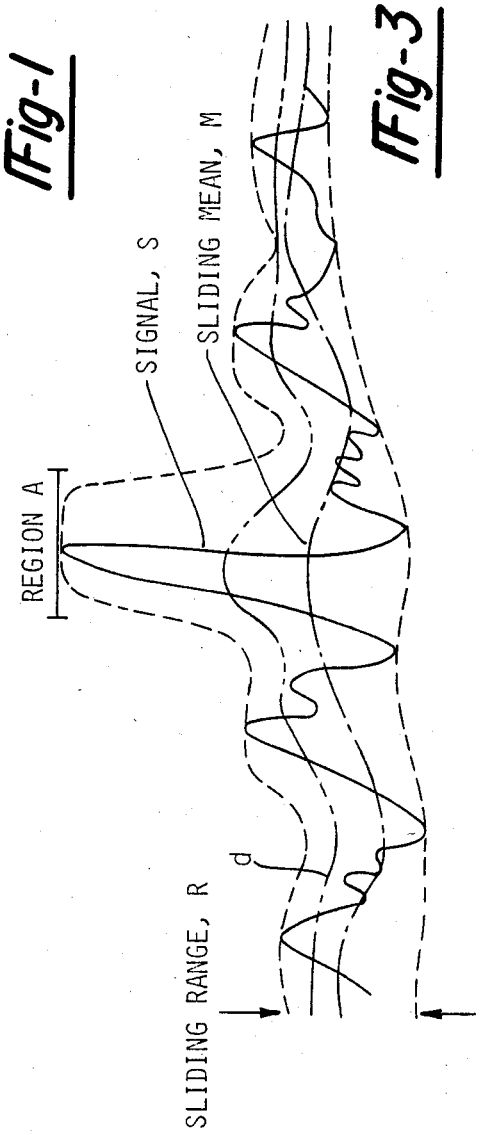
FIG. 3 is a graph illustrating the resultant transformation of the image data during erosion and dilation steps carried out in the system of FIG. 2.

A sequence of erosion and dilation steps is utilized in the preferred embodiment to extract potential landmarks in each of the two frames of image data. Assume that the signal curve in FIG. 3 is a cross section of the multibit pixel values taken along a single west-east line of FIG. 1A. Typical thresholding techniques using a stationary level would operate to remove many potential landmarks from further consideration. It is, of course, desirable to retain a reasonable number of landmark features distributed throughout each frame and thus, a variable thresholding technique is employed.

For each frame, first a sliding mean over a region is estimated. This is done by creating two new images: (1) by dilating the frame image with a disc shaped structuring element, and (2) by eroding the frame image with this same structuring element. The dilation and erosion steps are performed by using maximum value transformations of the gray scale image in the manner more particularly described as "3-D" transformations in the referenced U.S. Pat. No. 4,322,716.

The images resulting from the dilation and erosion steps are then averaged pixelwise to obtain an estimate of the mean. The curve M is FIG. 3 represents the sliding mean of the single west-east line. The next step is to obtain the sliding range which is a measure of the dispersion of gray scale values in the region. This is done by pixelwise differencing the pairs of images obtained by dilating and by eroding the two frames with the disk shaped structuring element. A local threshold curve d is generated which is the value of the sliding mean added to an appropriate fraction of the value of the sliding range.

The next step is to threshold the original pixel matrices with the threshold curve d. If the value of a pixel in the image pixel matrix is greater than that in the corresponding pixel of the threshold matrix, the resulting pixel is transformed to a value of 1. Otherwise, the matrix pixels are transformed to a value of zero.

The effect of including the sliding mean in the threshold level is to insure an opportunity for landmarks to be extracted regardless of the overall intensity of the image. The effect of including a fraction of the sliding range is to limit the size of the landmarks detected. In general, the landmarks detected will be smaller than the size of the structuring element used for dilation and erosion and there will be 1-2 of them per area of disk on each frame.

The thresholding technique described above has thus reduced the image matrix to groups or islands of binary ones and zeros associated with potential landmarks in the image. The sizes of these islands will depend upon their geometric shape in the original image matrix or frame, but most will be smaller than the structuring element used to generate the threshold image. The size of the disk is determined by the maximum amount of translation that might exist between corresponding points in the two images. A larger disk reduces the total number of features detected and thus reduces the possible confusion as to the correspondence between points in the two images.

Concavities in the islands of binary ones are preferably filled by dilating the matrix with a convex hull. The purpose of this is to smooth the boundaries of the islands, thereby stabilizing the resulting estimate of the central point of the island. Next, tiny islands (generally associated with noise) are removed by eroding the image matrix with a relatively small structuring element.

Thus far in the process potential landmarks have been identified. The next major step is to locate islands having the same general shape in the two transformed image matrices. Later, the landmarks in one frame will be matched with corresponding landmarks in the other frame. Then, based upon the spatial relationship between the matched landmarks, the original second frame of image data will be transformed into registration with the first frame of image data.

Pursuant to the present invention the first transformed frame of image data is eroded in a given number of stages 38 (shown in FIG. 2) to reduce particular features or islands in the frame to single points. For example, a given circular structuring element may be programmed into a number of stages in the pipeline and used to erode the image matrix successively for the number of stages in the pipeline without destroying spatial connections within the islands. The output of the last stage will thus be a matrix having some islands reduced to single centrally located points and other islands having more than one connected point. It is desirable to choose a number of erosion steps which will just completely erode the disk used for establishing thresholds initially.

Those islands having more than one point are removed from the image matrix. This is accomplished by a single stage in the pipeline processor. The operation removes any center pixels in a 3×3 neighborhood which have binary 1's as neighbors. The effect is to keep only those islands which are less than or equal to a given size.

This "reduction step" is accomplished for both frames, leaving for each frame a transformed matrix having a sprinkling of nonconnected single pixel values of one. These points represent landmarks in each frame that have at least some shape characteristics in common. The X, Y coordinates of each remaining point in each frame are automatically extracted and stored in small arrays (lists) for the purpose of establishing correspondence. Hence, the essential information needed to register the frames has been extracted from the frames of data and stored in a list. This results in a substantial saving in the number of points to process to obtain results.

FIG. 4 shows the lists which result from the points extracted by the procedure above. In the first frame, the procedure has found features corresponding to points 22-34 in FIG. 1A. In FIG. 1B, the procedure has identified points corresponding to all of these points except point 34, which results from an object which moves off the image frame between the times when the two images are taken.

FIG. 5 is a pictorial representation of the points that may be produced from the two frames of image data shown in FIG. 1. The dots in FIG. 5 represent the chosen landmarks in frame 1 whereas the X's represent the chosen landmarks in frame 2. A comparison of FIGS. 1 and 5 will show that the chosen landmarks generally correspond to islands 22-34. Landmarks corresponding to the larger islands 12, 16 and 18 do not appear in FIG. 5 because they will not be reduced to single points during the given number of erosion steps carried out above. Smaller islands 14 and 20 are completely removed during the erosion steps.

A study of FIG. 5 will reveal that there are several well-defined matched pairs of landmark points but that the center of points in the right-hand portion are not so well-defined. On this side, it is not clear (at least from the machine viewpoint) which dot belongs with each X. Since the spatial relationship between the landmark pairs will be used to generate the amount of translation required, it is necessary to eliminate any ambiguities. This is accomplished by removing those points in each of the image frames having zero or more than one point in the other frame with a given spatial relationship to the point in the first frame. Points can be removed by relatively straightforward techniques using a general purpose computer to interrogate the list in a computer memory device. For example, the dotted box 50 in FIG. 5 could represent an acceptance region used to remove the center dot if zero or more than one X is found in its immediate neighborhood.

Referring to FIG. 4, lines have been drawn between the listing of each point in one frame and the listing of all points in the other frame which fall within the box when it is centered about the first point. For example, the dot 30 in FIG. 5 corresponding to feature 30 in FIG. 1 is sufficiently close to the x's 28' and 30' corresponding to features 28' and 30' to be linked. This is signified in FIG. 4 by the lines connecting the (x,y) coordinates for point 30 to both the (x,y) coordinates for points 28' and 30' in frame 2. In each list, all (x,y) coordinate pairs that are not connected to exactly one (x,y) coordinate pair in the other list are eliminated from further consideration. For this reason, points 28, 30 and 34 are eliminated for the purposes of establishing this correspondence.

It should be noted that if copies of box 50 were drawn around each of the dots and x's in FIG. 5, the only ones retained are those where a single symbol of the other type is contained within the box. Thus, when point 28' is surrounded by the box 52, it is not retained because there are two dots (28 and 30) within the boundaries of box 52. On the other hand, when point 28 is surrounded by the dotted box 54, it is retained because there is only one x within the boundaries of box 54.

It can readily be seen that of the original points 28, 28', 30 and 30' (listed in FIG. 4 and shown in FIG. 5), points 28' and 30 have been eliminated by this process, leaving points 28 and 30'. Also, point 34 has been eliminated because there are no x's sufficiently close to it. A second application of this procedure will obviously eliminate points 28 and 30'.

FIG. 6 represents the result of using this process. Each landmark point (dot) in frame 1 is matched with a corresponding landmark point (x) in frame 2. The coordinates of the landmark point pairs retained in the list (in FIG. 4) are stored. The centers of mass of the points designated by dots and Xs are computed. This can be accomplished by taking the average of all of the X coordinates for the points in frame 1, for example, and taking the average of all of the Y coordinates. The translation between these centers of mass is what is needed to bring the two lists into very close registration. This translation is performed on one of the lists, say the list associated with frame 2.

Note that once the lists associated with frames 1 and 2 have been brought into closer registry, referring back to the original list of landmark points and using a smaller distance criterion, the association procedure can be repeated. With each repetition of this procedure, a better registration of the lankmark points is achieved. After the association procedure has been applied sufficiently often to achieve unambiguous pairing of an adequate number of points, a final transformation of lists is done to produce the final level of registration. The overall effect of these iterative translations can alternatively be viewed as enforcing some particular geometric relationship among the original landmark points.

This final transformation may be viewed as three separate transformations: a translation, a rotation, and a scaling transformation. A reliable update of translation can be obtained as well as an estimate of the rotation and scale transformations required.

It can be shown that the relationship between each landmark point, $X_n^2$, $Y_n^2$, in the list associated with frame 1 and its estimated corresponding landmark point, $X_n^2$, $Y_n^2$, in the list associated with frame 2 can be expressed as follows:

$$(\hat{x}_n^2, \hat{y}_n^2) = (ax_n^1 - by_n^1 + u, bx_n^1 + ay_n^1 + v) \quad (1)$$

where $a = r \cos \theta$ and $b = r \sin \theta$ \quad (2)

In these equations, r is the scale factor, $\theta$ the rotational factor, and u and v the remaining translational factors which will bring the landmark pair into registration.

A matrix, shown below, can be formed to represent the transformation which maps each of the landmark points of frame 1 into registration with the points of frame 2:

$$[A][\Psi] = [B] \text{ or} \quad (3)$$

$$\begin{bmatrix} x_1^1 & -y_1^1 & 1 & 0 \\ y_1^1 & x_1^1 & 0 & 1 \\ x_2^1 & -y_2^1 & 1 & 0 \\ y_2^1 & x_2^1 & 0 & 1 \\ \cdot & \cdot & \cdot & \cdot \\ \cdot & \cdot & \cdot & \cdot \\ \cdot & \cdot & \cdot & \cdot \\ x_n^1 & -y_n^1 & 1 & 0 \\ y_n^1 & x_n^1 & 0 & 1 \end{bmatrix} \begin{bmatrix} a \\ b \\ u \\ v \end{bmatrix} = \begin{bmatrix} \hat{x}_1^2 \\ \hat{y}_1^2 \\ \hat{x}_2^2 \\ \hat{y}_2^2 \\ \cdot \\ \cdot \\ \cdot \\ \hat{x}_n^2 \\ \hat{y}_n^2 \end{bmatrix} \quad (4)$$

$$\begin{bmatrix} a \\ b \\ u \\ v \end{bmatrix} = \begin{bmatrix} x_1^1 & -y_1^1 & 1 & 0 \\ y_1^1 & x_1^1 & 0 & 1 \\ x_2^1 & -y_2^1 & 1 & 0 \\ y_2^1 & -x_2^1 & 0 & 1 \\ \cdot & \cdot & \cdot & \cdot \\ \cdot & \cdot & \cdot & \cdot \\ \cdot & \cdot & \cdot & \cdot \\ x_n^1 & -y_n^1 & 1 & 0 \\ y_n^1 & x_n^1 & 0 & 1 \end{bmatrix}^{-1} \begin{bmatrix} \hat{x}_1^2 \\ \hat{y}_1^2 \\ \hat{x}_2^2 \\ \hat{y}_2^2 \\ \cdot \\ \cdot \\ \cdot \\ \hat{x}_n^2 \\ \hat{y}_n^2 \end{bmatrix} \quad (5)$$

A conventional least squares fit analysis is then performed to obtain an optimal solution for a, b, u, and v (that is the values for a,b,u, and v where $$\sum_{1}^{N} [(\hat{x}_i^2 - x_i^2)^2 + (\hat{y}_i^2 - \hat{y}_i^2)^2]$$

is minimized). The optimal values for a and b may then be substituted into equation 2 to obtain the optimal rotational and scale factors, $\theta$ and r. It should be noted that this step may be omitted since only the values of a, b, u, v are necessary to transform all of the pixel data of frame 1 into registration with all of the pixel data of frame 2. This transformation may be done on a general purpose computer programmed to perform the matrix operation shown in equation 4. Programs suitable for performing these calculations are well known to those skilled in the art. Two references to the development of the least squares method as applied to the "normal" equations given in equations 1 and 2, above are: (1) Neter, John & Wasserman, Wm., "Applied Linear Statistical Models," 1974, Richard Irwin Publishers, Homewood, Ill., pp. 36ff, and (2) Bickel, Peter J. & Doksum, Kjell A., "Mathematical Statistics: Basic Ideas and Related Topics," 1977, Holden-Day, p. 94–96.

It will be appreciated by those skilled in the art that, while most or all of the pixels in frame 1 will now be in registration, corresponding pixels of transformed frame 2, some pixels may not be registered. A composite matrix formed by the subtraction of frame 1 from transformed frame 2 is then generated to reveal any pixels that are not coincident. A histogram of the composite matrix allows easy identification of thresholds by which the changes between the two frames can be detected. In FIG. 7 the area labeled 56 represents the front of vehicle 10 and area 58 the rear thereof. Through analysis of such shapes, the speed and direction of vehicles can be estimated. Various other techniques are well-known in the art to obtain the difference in the pixel values between the two frames once they have been registered in the manner taught by this invention.

In some applications, other transformations, in addition to the translation performed in the above application of this invention, must necessarily be performed. An example occurs in the case of a low-flying aircraft with forward-looking sensors. The reason is that the angular change of position for objects close to the aircraft is much greater than the change for objects further removed. This transformation, known as the perspective transformation, is a one-to-one transformation whose parameters are determined by the attitude and altitude of the aircraft. It can, therefore, be applied to the image data as collected to produce a plan view of the scene below. After transformation, the procedure described above can be used to solve the correspondence problem. Other one-to-one transformations may likewise be applied to image date collected before the correspondence problem is solved.

The stereographic projection problem can also be solved using these methods, based on the differential shifts exhibited by objects in the two frames, depending on the distances from the imaging sensor to the objects. From the various shifts shown by the objects in going from one frame to the other, it is possible to calculate the distances to those objects. These shifts can be determined by the method of this invention.

Other possible applications of the method of this invention are (1) to compare images taken days or more apart, such as for studying crop growth from Landsat images and (2) to compare images of electrophoretic gels such as comparing a sample with one or more standards.

Therefore, while this invention has been described in connection with a particular example thereof, no limitation is intended except as defined in the following claims.

I claim:

1. A method of detecting correspondence between multiple frames of image data, each frame represented by a matrix of pixels, said method comprising the steps of:

transforming the matrix representing a first frame of image data in at least one serial neighborhood processing stage by a predetermined number of electronic erosion sequences thereby reducing the matrix to a plurality of discrete islands of pixels;

transforming the matrix representing a second frame of image data in at least one serial neighborhood processing stage by performing the predetermined number of electronic erosion sequences to reduce the matrix associated with the second frame to a plurality of discrete islands of pixels;

removing, from the matrix representing the first frame of image data, all discrete islands of pixels which consist of a plurality of pixels, to leave a first transformed matrix containing a first plurality of single points of nonconnected pixels;

removing, from the matrix representing the second frame of image data, all discrete islands of pixels which consist of a plurality of pixels, to leave a second transformed matrix containing a second plurality of single points of nonconnected pixels;

storing, for each of the two pluralities of single points, the coordinates of the single points; and labeling each single point in a transformed matrix having exactly one single point in the other transformed matrix satisfying a predetermined spatial relationship with its location in the other transformed matrix, whereby the correspondence between multiple frames of image data is detected.

2. The method of claim 1 wherein said islands are single points of nonconnected pixels.

3. A method of registering multiple frames of image data each represented by a matrix of pixels, said method comprising the steps of:

a. transforming a first pixel matrix associated with a first frame of image data by electronically eroding it in a first predetermined number of serially connected neighborhood processing stages to produce a first transformed matrix containing a first plurality of single points of nonconnected pixels;

b. transforming a second pixel matrix associated with a second frame of image data by electronically eroding it in a second predetermined number of serially connected neighborhood processing stages to produce a second transformed matrix containing a second plurality of single points of nonconnected pixels;

c. storing, for each of the two pluralities of single points, the coordinates of the single points;

d. labeling each nonconnected pixel in a transformed matrix having exactly one nonconnected pixel in the other transformed matrix satisfying a predetermined spatial relationship with its location in the other transformed matrix;

e. removing each unlabeled nonconnected pixel from its transformed matrix, thereby reducing the transformed matrices to a form where each nonconnected pixel in one reduced matrix has a corresponding nonconnected pixel in the other reduced matrix;

f. determining the spatial relationship between pairs of nonconnected pixels in the reduced matrices;

g. transforming one frame of pixel data into registration with the other frame as a function of the spatial relationship between corresponding pixels in the two reduced matrices; and h. comparing the one frame and the transformed other frame to detect differences therebetween.

4. The method of claim 3, wherein steps a.-f. are repeated, using the nonconnected pixel matrices resulting from the last repetition, until a satisfactory registration of the nonconnected pixels is obtained.

* * * * *

UNITED STATES PATENT AND TRADEMARK OFFICE
CERTIFICATE OF CORRECTION

PATENT NO. : 4,590,607
DATED : May 20, 1986
INVENTOR(S) : Richard J. Kauth

It is certified that error appears in the above-identified patent and that said Letters Patent is hereby corrected as shown below:

Column 2, line 50 "Fig. 7" should start a new paragraph.

Column 4, line 39 "is Fig. 3" should be --in Fig. 3--.

Column 5, lines 45-47 "1's as neighbors. The effect is to keep only those islands which are less than or equal to a given size." should not be in boldface type.

Column 6, line 15 "center of points" should be --cluster of points--.

Column 7, line 12 "of the lankmark points" should be -- of more landmark points--.

Column 7, line 29 "$X_n^2$, $Y_n^2$" should be --$\hat{X}_n^2$, $\hat{Y}_n^2$--.

Column 8, line 5 " $\sum_1^N [(\hat{x}_i^2 - x_i^2)^2 + (y_i^2 - \hat{y}_i^2)^2]$ " should be -- $\sum_1^N [(x_i^2 - \hat{x}_i^2)^2 + (y_i^2 - \hat{y}_i^2)^2]$ --.

Signed and Sealed this

Twenty-third Day of September 1986

[SEAL]

Attest:

DONALD J. QUIGG

Attesting Officer

Commissioner of Patents and Trademarks